UNITED STATES PATENT OFFICE.

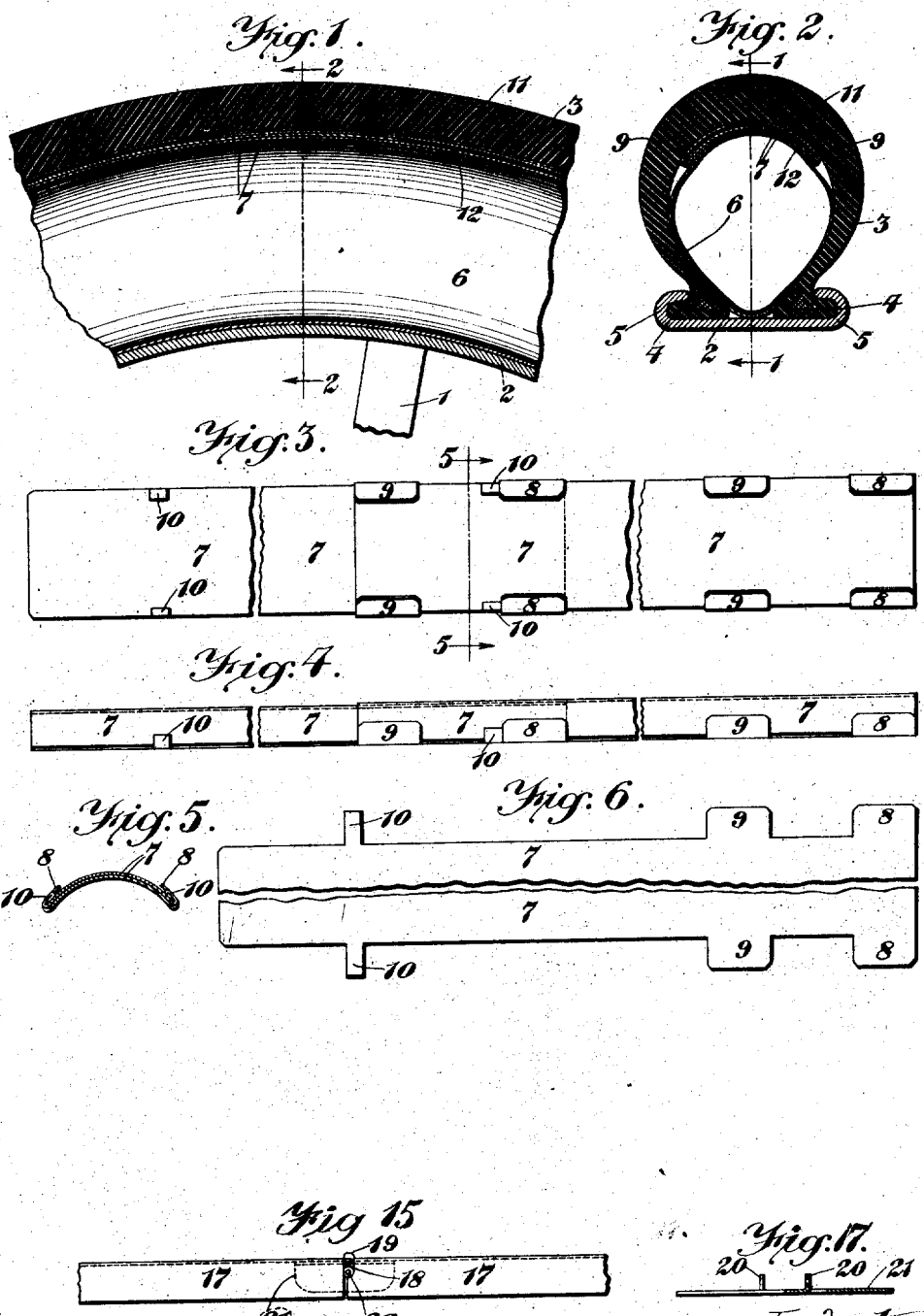

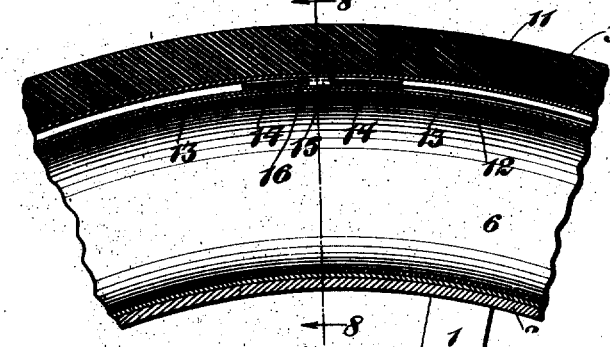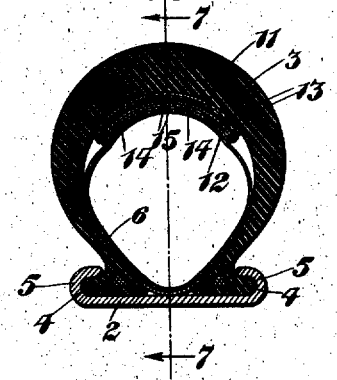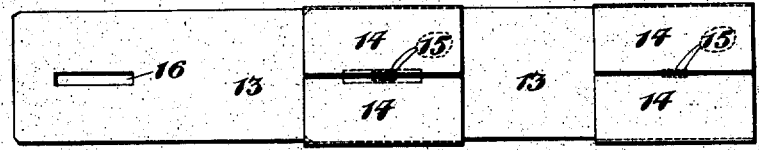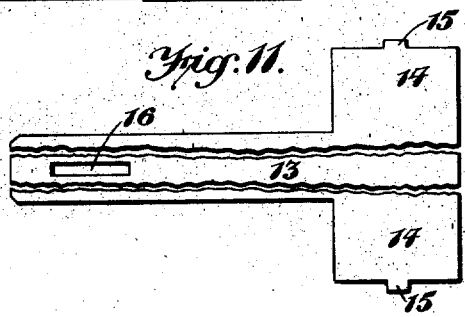

MINOR E. CHAMBERLAIN, OF LEBANON, MISSOURI.

RESILIENT WHEEL.

1,257,673.   Specification of Letters Patent.   Patented Feb. 26, 1918.

Application filed November 4, 1915. Serial No. 59,510.

*To all whom it may concern:*

Be it known that I, MINOR E. CHAMBERLAIN, a citizen of the United States, residing at Lebanon, county of Laclede, and State of Missouri, have invented a new and useful Resilient Wheel, of which the following is a specification.

This invention relates to resilient wheels and more particularly to wheels for vehicles having an inflatable tire and consists in the novel construction hereinafter more fully disclosed.

An object of the invention is to provide in resilient wheels an inflatable tire provided with a metallic shield mounted within the outer casing which will prevent the penetration of the tire and the consequent puncture thereof and which, at the same time, will not reduce to any appreciable extent the resiliency of the wheel.

Another object of the invention is to provide in tires having resilient wheels a flexible and yieldable shield comprising a series of movable plates joined together to form the annular shield adapted to be mounted within the outer casing of the tire.

With these and other objects and advantages, attainable from the construction hereinafter disclosed, in view I have produced the new article of manufacture comprising the parts of novel design arranged and combined in the novel manner hereinafter described and claimed, reference being made in the course of the description to the accompanying drawings, in which I have illustrated specific embodiments of the invention, and in which—

Figure 1 is a vertical section through a portion of a wheel illustrating an embodiment of the invention, taken substantially on the line 1—1 of Fig. 2.

Fig. 2 is a cross section through the same parts of the wheel construction, the cross section being on a line such as 2—2 of Fig. 1.

Fig. 3 is a broken plan view of a section of a shield designed in accordance with the invention and illustrating one embodiment thereof.

Fig. 4 is an edge view of the same parts illustrated in Fig. 3.

Fig. 5 is a cross section through the parts illustrated in Fig. 3 taken substantially upon the line 5—5 of said figure.

Fig. 6 is a plan view of a broken and compressed blank from which one section of the shield illustrated in the preceding figures is made.

Fig. 7 is a view of the same parts illustrated in Fig. 1, showing a shield made in accordance with another specific embodiment of the invention and taken substantially on the line 7—7 of Fig. 8.

Fig. 8 is a view of the same parts illustrated in Fig. 7 and taken on a cross sectional line, such as 8—8 of Fig. 7.

Fig. 9 is a section of the guard or shield designed in accordance with the specific embodiment of the invention illustrated in the two preceding figures.

Fig. 10 is an edge view of the section of the shield illustrated in Fig. 9.

Fig. 11 is a broken compressed plan view of a blank from which the shield illustrated in the next preceding figures is made.

The wheel includes the usual spokes 1 which support at their outer ends a rim member 2 upon which is mounted an outer casing 3 of an inflatable tire. It will be understood that the method of attachment of the outer casing to the rim member may be of any of the known designs, that illustrated in the drawings being of the "clencher" type in which beads 4 are received in channels 5 of the rim member 2. Within the casing 3 is inclosed the inflated inner tube 6.

The impenetrable shield or guard for preventing the puncture of the inner tube 6 comprises relatively movable sections joined together so that after the inner tube has been inflated the shield will be held in position below the tread of the outer casing and will conform in its movement substantially to the movement of the casing. Thus, while shielding the inner tube from penetration it will at the same time so conform to the movement of the resilient tire as not to diminish to any appreciable extent the resiliency of the tire.

Invention is broadly in the provision of the shield or guard consisting of relatively movable sections and made of several satisfactory designs, some of which I have illustrated in the drawings and, in order that the specific constructions may be understood, I will describe them as illustrated.

The design of shield illustrated in Figs. 1 to 6 inclusive comprises a series of metallic plates 7 formed from a blank specifically illustrated in Fig. 6. By reference to Fig. 6 it will be observed that the plate, which constitutes one of the movable sections of the shield, is provided adjacent to one end with extending lips 8 and with lips 9 spaced therefrom. The lips 8 and 9 are adapted to be upturned over the edges of the adjacent plate, the plates being held together by the over-turned lips. Adjacent to the end opposite to the end in which the lips 8 are provided, are lips 10 adapted to be folded over, as shown specifically in Figs. 3 and 4 so that when the plates are assembled the abutments formed from the lips 10 will be disposed between the inner adjacent edges of the turned-over lips 8 and 9. The sections of the shield will be free to move the distance between the adjacent edges of the respective lips 8 and 9.

The surface of the shield is curved to conform to the contour of the outer casing 3 below the tread thereof, and is adapted to be held in place between the inner tube and the outer casing, the pressure in the inner tube forcing the shield against the inner wall of the outer tube. A protecting guard 11 of canvas is interposed between the upper edge of the shield and the inner wall of the outer casing and a similar guard 12 of canvas or other suitable material is interposed between the outer wall of the inner casing and the inner wall of the shield. The guards 11 and 12 prevent damage to the casings by the metal surfaces, it being understood that they are held firmly in place by the pressure from within the tire.

The design of the shield illustrated in Figs. 7 to 11 inclusive comprises sections made from a blank 13 in the form specifically illustrated in Fig. 11, which blank it will be observed includes adjacent to one end outwardly extending portions 14 having lips 15 at their outer edges. The portions 14 are adapted to be folded backwardly upon the edges of the blank 13 and the extremity of the matching section disposed between the face of the blank 13 and the inner surfaces of said backwardly folded portions 14, and the lips 15 being depressed downwardly and extending into a slot 16 formed at the opposite end of the adjacent blank. In this construction the relative movement of the sections is limited by the abutments formed from the depressed lips 15 engaging the ends of the slot 16.

In each of the forms of the invention illustrated in the drawings the same basic principle of relatively movable sections constituting a shield is observed. The shield formed as it is from sections of flexible metal joined together by movable connections obviates the deficiency of a rigid metal shield and preserves the resiliency of the wheel.

I am aware that the same principle may be embodied in additional forms, and I do not desire to limit myself to any of the specific forms shown, but what I claim and desire to secure by Letters Patent, is:

1. In a wheel, a tire comprising an elastic outer casing; an inner tube within the casing; and a resilient annular shield within the outer casing and encircling the inner tube composed of a series of plates curving to the contour of the inner wall of the outer casing, one end of each plate overlapping the end of an adjacent plate of the series, a pair of tongues integral with the overlapped end of each plate engaging the overlapping plate and holding said plates in overlapped relation and permitting relative longitudinal movement of said plates, and abutment members on each of the overlapping plates arranged to engage against the tongues on the overlapping plates to limit the longitudinal movement of the plates relative to each other.

2. In a wheel, a tire comprising an elastic outer casing; an inflatable tube within the casing; a resilient annular shield removably located within the outer casing and encircling the inner tube composed of plates curving to the contour of the inner wall of the outer casing and having smooth inner surfaces, one end of each plate overlapping the end of an adjacent plate of the series, a pair of tongues integral with the overlapped end of each plate bent outwardly and inwardly upon the outer surface of the overlapping end of the adjacent plate and holding said plates in overlapped relation and permitting relative longitudinal movement of said plates to conform to the expansion and compression of the tire, abutment members on the outer sides of the overlapping ends of said plates between said tongues and arranged to engage against the tongues on the overlapping plates to limit longitudinal movement of the plates relative to each other; and a pliable guard between said shield and the inner tube.

3. In a wheel, a tire comprising an elastic outer casing; an inner tube within the casing; and a resilient expansible and contractible shield between the tube and the inner wall of the casing comprising a series of overlapping plates movable longitudinally relative to each other to conform to the expansion and contraction of the wheel, tongues on the overlapped plates bent around and engaging the edges of the overlapping plates, abutments on the overlapping plates extending between and coöperating with said tongues to limit longitudinal movement of said plates relative to each other; and pliable material between said shield and the inner wall of the outer casing and also between the shield and the inner tube.

4. In a wheel, a tire comprising an elastic outer casing; an inner tube within the casing; and a resilient annular shield within the outer casing and encircling the inner tube and composed of a series of plates curving to the contour of the inner wall of the outer casing, one end of each plate overlapping the end of an adjacent plate of the series, tongues on each of said plates bent around and engaging the edges of another plate and holding said plates in overlapped relation and permitting relative longitudinal movement of said plates to conform to the expansion and contraction of the tire, and means whereby said tongues will limit the longitudinal movement of the plates relative to each other.

5. In a wheel, a tire comprising an elastic outer casing; an inflatable tube within the casing; a resilient annular shield removably located within the outer casing and encircling the inner tube composed of a series of plates curving to the contour of the inner wall of the outer casing and having smooth inner surfaces and being movable longitudinally relative to each other to conform to the expansion and contraction of the tire, tongues on certain of said plates bent around and engaging the edges of others of the series and holding said plates in annular series between the outer casing and the tube, and means whereby said tongues will limit longitudinal movement of said plates relative to each other.

6. In a wheel, a tire comprising an elastic outer casing; an inflatable tube within the casing; a resilient annular shield removably located within the outer casing and encircling the inner tube composed of a series of plates curving to the contour of the inner wall of the outer casing and having smooth inner surfaces, one end of each plate overlapping the end of an adjacent plate of the series, said plates being longitudinally movable relative to each other to conform to the expansion and contraction of the tire, tongues in connection with certain of said plates bent around and engaging the edges of others of the series and holding them in overlapped relation, means whereby said tongues will limit longitudinal movement of said plates relative to each other; and a pliable guard between said shield and the inner tube.

In witness whereof, I have signed this specification in the presence of two subscribing witnesses.

MINOR E. CHAMBERLAIN.

Witnesses:
J. R. HOOD,
A. P. DRAPER.